(12) United States Patent
Rinaldi et al.

(10) Patent No.: US 12,392,407 B2
(45) Date of Patent: Aug. 19, 2025

(54) SYSTEM AND METHOD FOR SEAMLESS SHIFTING IN A DUAL MOTOR TRANSMISSION WITH MINIMAL GEARS

(71) Applicant: DANA ITALIA S.R.L., Trentino (IT)

(72) Inventors: Pier Paolo Rinaldi, Arco (IT); Giacomo Faggiani, Rovereto (IT); Mark Slater, Warwickshire (GB)

(73) Assignee: DANA ITALIA S.R.L., Trentino (IT)

( * ) Notice: Subject to any disclaimer, the term of this patent is extended or adjusted under 35 U.S.C. 154(b) by 222 days.

(21) Appl. No.: 18/161,790

(22) Filed: Jan. 30, 2023

(65) Prior Publication Data
US 2024/0255053 A1 Aug. 1, 2024

(51) Int. Cl.
| F16H 61/04 | (2006.01) |
| B60K 1/02 | (2006.01) |
| B60W 10/08 | (2006.01) |
| F16H 61/688 | (2006.01) |

(52) U.S. Cl.
CPC ......... *F16H 61/0403* (2013.01); *B60W 10/08* (2013.01); *F16H 61/688* (2013.01); *F16H 2061/0422* (2013.01)

(58) Field of Classification Search
CPC ............... F16H 61/0403; F16H 61/688; F16H 2061/0422; F16H 61/04; F16H 2003/0811; F16H 3/089; F16H 2061/0433; F16H 2200/0021; F16H 2200/0034; B60K 1/02; B60W 10/08
See application file for complete search history.

(56) References Cited

U.S. PATENT DOCUMENTS

| 8,100,207 | B2 | 1/2012 | Oba et al. | |
| 9,657,822 | B2 | 5/2017 | Park et al. | |
| 9,789,754 | B2 | 10/2017 | Zhu et al. | |
| 10,252,608 | B2 | 4/2019 | Liu et al. | |
| 11,162,562 | B2 | 11/2021 | Yu et al. | |
| 2009/0019967 | A1* | 1/2009 | Himmelmann | B60K 6/46 74/331 |
| 2010/0023230 | A1* | 1/2010 | Holmes | B60W 10/113 74/664 |

(Continued)

FOREIGN PATENT DOCUMENTS

| AT | 522931 A1 * | 3/2021 | ............ B60K 1/02 |
| CN | 202753745 U * | 2/2013 | ............ B60K 1/02 |

(Continued)

*Primary Examiner* — Tisha D Lewis
(74) *Attorney, Agent, or Firm* — McCoy Russell LLP

(57) ABSTRACT

Methods and systems for a dual motor transmission system that includes an intermediate shaft oriented parallel to both of a first shaft arranged with a first gear mesh, a third gear mesh, and a first low friction engaging device located between the first gear mesh and the third gear mesh and a second shaft arranged with a second gear mesh, a fourth gear mesh, and a second low friction engaging device located between the second gear mesh and the fourth gear mesh, a first electric motor coupled to the first shaft to enable a first reduction ratio and second reduction ratio of the first electric motor between the first shaft and the intermediate shaft, and a second electric motor coupled to the second shaft to enable a first reduction ratio and second reduction ratio of the second electric motor between the second shaft and the intermediate shaft.

14 Claims, 14 Drawing Sheets

(56) References Cited

U.S. PATENT DOCUMENTS

| | | | |
|---|---|---|---|
| 2014/0358383 A1* | 12/2014 | Tao | F16H 61/688 |
| | | | 701/51 |
| 2019/0219159 A1* | 7/2019 | Rinderknecht | F16H 61/0403 |
| 2022/0381323 A1* | 12/2022 | Hedman | F16H 37/065 |
| 2023/0175578 A1* | 6/2023 | Folkesson | B60K 25/06 |

FOREIGN PATENT DOCUMENTS

| | | | | |
|---|---|---|---|---|
| CN | 105416049 B * | 8/2016 | | B60K 1/02 |
| EP | 2529967 A1 | 12/2012 | | |
| WO | WO-2020148452 A1 * | 7/2020 | | B60K 6/48 |
| WO | WO-2023139228 A1 * | 7/2023 | | B60K 1/02 |

\* cited by examiner

| Transmission Drive Ranges | EMA | EMB |
|---|---|---|
| DRNN | Neutral | Neutral |
| DR11 | First Speed | First Speed |
| DRN1 | Neutral | First Speed |
| DR21 | Second Speed | First Speed |
| DR2N | Second Speed | Neutral |
| DR22 | Second Speed | Second Speed |
| DRN2 | Neutral | Second Speed |

SYSTEM AND METHOD FOR SEAMLESS SHIFTING IN A DUAL MOTOR TRANSMISSION WITH MINIMAL GEARS

TECHNICAL FIELD

The present disclosure relates generally to mechanical transmission system in which multiple transmission drive ranges and gearshifts are selectively obtainable based on shaft configuration of a dual motor transmission system.

BACKGROUND AND SUMMARY

Single speed ratio transmissions of off highway battery electric vehicles (BEV) utilize an adequately sized motor (e.g., a large enough motor) that is fast enough to achieve maximum vehicle speed and provides high torque at low speeds. However, sizing the motor based on vehicle tractive effort (e.g., high torque) results in poor vehicle top speed whereas sizing the motor based on targeting the vehicle maximum speed may hinder tractive effort performance. As such, incorporating a single speed ratio transmission may result in oversizing the motor.

The demanded torque and maximum vehicle speed may be relaxed by utilizing a transmission with two or more speed ratios. Depending on the design, multi-ratio transmissions may enable different types of gearshifts, including seamless shifting and torque interruption shifting. During a gearshift in seamless shifting, the transmission may provide output torque continuously, enabling the gearshift to be performed unnoticed by a driver, whereas the output torque may be disrupted during a gearshift in torque interruption shifting.

The inventors have recognized various issues with such an approach. For example, if multiple speed ratios are demanded, such as two speeds, seamless shifting of the gearshift may result in lower efficiency due to higher drag torque linked to the presence of clutches and torque interruption shifting of the gear shift may hinder the driver's comfort due to a perceived jerk experienced by the driver. Further issues with regards to seamless shifting include oversizing the motor to compensate for power dissipation during clutch handover.

In one embodiment, the approaches disclosed herein provide a system for a transmission, comprising an intermediate shaft oriented parallel to both of a first shaft comprising a first gear mesh of a plurality of gear meshes, a third gear mesh of the plurality of gear meshes, and a first low friction engaging device located between the first gear mesh and the third gear mesh and a second shaft comprising a second gear mesh of the plurality of gear meshes, a fourth gear mesh of the plurality of gear meshes, and a second low friction engaging device located between the second gear mesh and the fourth gear mesh, a first electric motor coupled to the first shaft to enable a first reduction ratio of the first electric motor via the first gear mesh and a second reduction ratio of the first electric motor via the third gear mesh between the first shaft and the intermediate shaft, and a second electric motor coupled to the second shaft to enable a first reduction ratio of the second electric motor via the second gear mesh and a second reduction ratio of the second electric motor via the fourth gear mesh between the second shaft and the intermediate shaft.

By utilizing the disclosed configuration of the transmission system, seamless shifting without a perceived decrease in tractive effort may be achieved by reducing power dissipation in existing systems. In particular, utilizing low friction engaging devices in the disclosed system may reduce power dissipation and lower efficiency associated with seamless shifting via wet clutches. Further, the disclosed system eliminates torque interruption via maintaining desired torque production with one electric motor and enables seamless shifting via synchronization without the use of mechanical synchronizers and utilizing less gears to achieve a plurality of reduction ratios, and increasing ease of control with regards to synchronization and traction of the dual electric motors by including the low friction engaging devices on the plurality of shafts coupled to the dual electric motors. In this way, as a result of the utilizing less system components, such as gears and the like, in the disclosed simplified configuration, manufacturing costs may be reduced due to reducing spatial aspects of the system with the advantage of increasing efficiency of seamless shifting with null torque interruption.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

FIG. 2B shows a plurality of transmission drive ranges for the 2-speed transmission system.

DETAILED DESCRIPTION

A transmission system with two or more selectable gears is described herein. In one embodiment, the transmission system may be a 2-speed transmission including a plurality of shafts and an intermediate shaft coupled to dual motors. An arrangement of a plurality of gear meshes comprising a plurality of gears in the system and low friction engaging devices allows the system to achieve gearshifts without decreasing the system's efficiency and increasing a driver's experience by reducing the frequency of perceived jerks of the vehicle. In addition, dog clutches or other frictionless devices are designed to enable seamless gearshifts without torque interruption.

In one embodiment, the systems disclosed herein provide a configuration for a 2-speed schematic wherein the first shaft, the second shaft, and the intermediate shaft are coupled to the plurality of gear meshes. The first shaft may be coupled to a first gear mesh and a third gear mesh. The second shaft may be coupled to a second gear mesh and a fourth gear mesh. In another embodiment, the systems disclosed herein may additionally include a third shaft coupled with a fifth gear mesh. A plurality of dog clutches coupled to the first shaft or second shaft may engage or disengage the plurality of gears of the plurality of gear meshes.

In other embodiments, gearshifts may be enabled via instructions configured, stored, and executed in at least one memory by at least one processor of an electronic control unit (ECU) in a vehicle to adjust one or more actuators based on signals from a plurality of sensors utilized to monitor the transmission system. In particular, specific gears in the plurality of gear meshes may be engaged or disengaged via the plurality of dog clutches via the one or more actuators to achieve different configurations of the first shaft wherein the first electric motor is coupled and the second shaft wherein the second electric motor is coupled. The different configurations of the first shaft and second shaft may enable a plurality of transmission drive ranges.

Figure 1A:
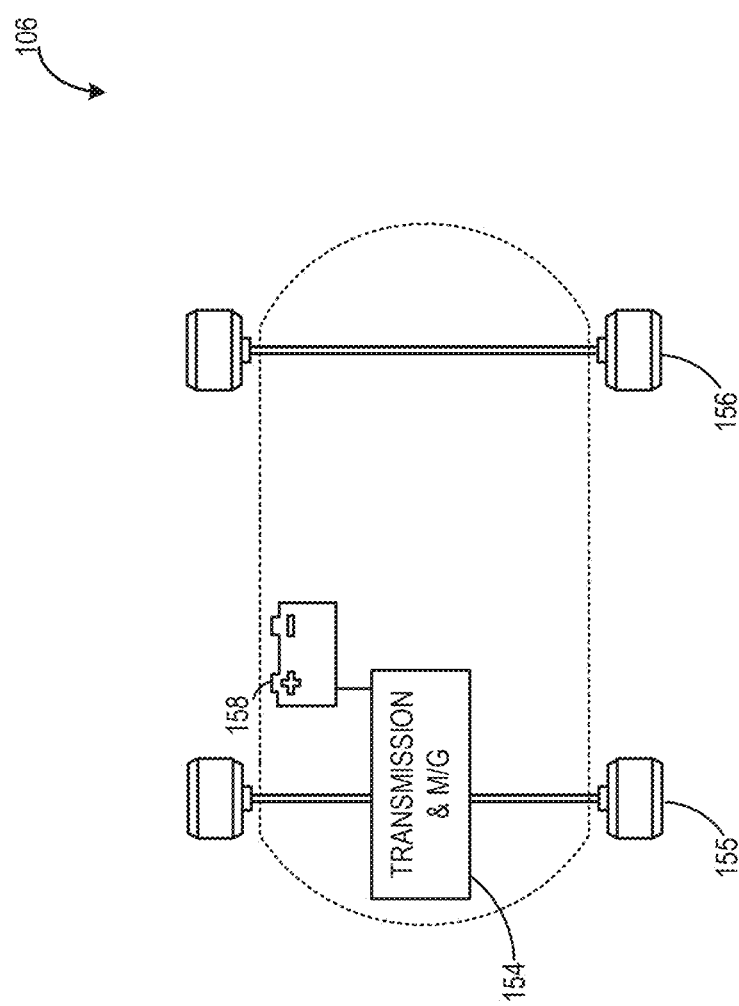
FIG. 1A shows a schematic of a car with a transmission, an electric motor, a battery, rear wheels, and front wheels.
Figure 1B:
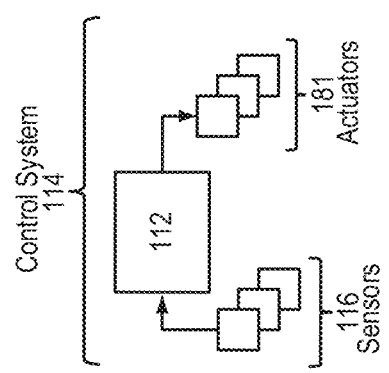
FIG. 1 B shows a control system of FIG. 1A.
Figure 2A:
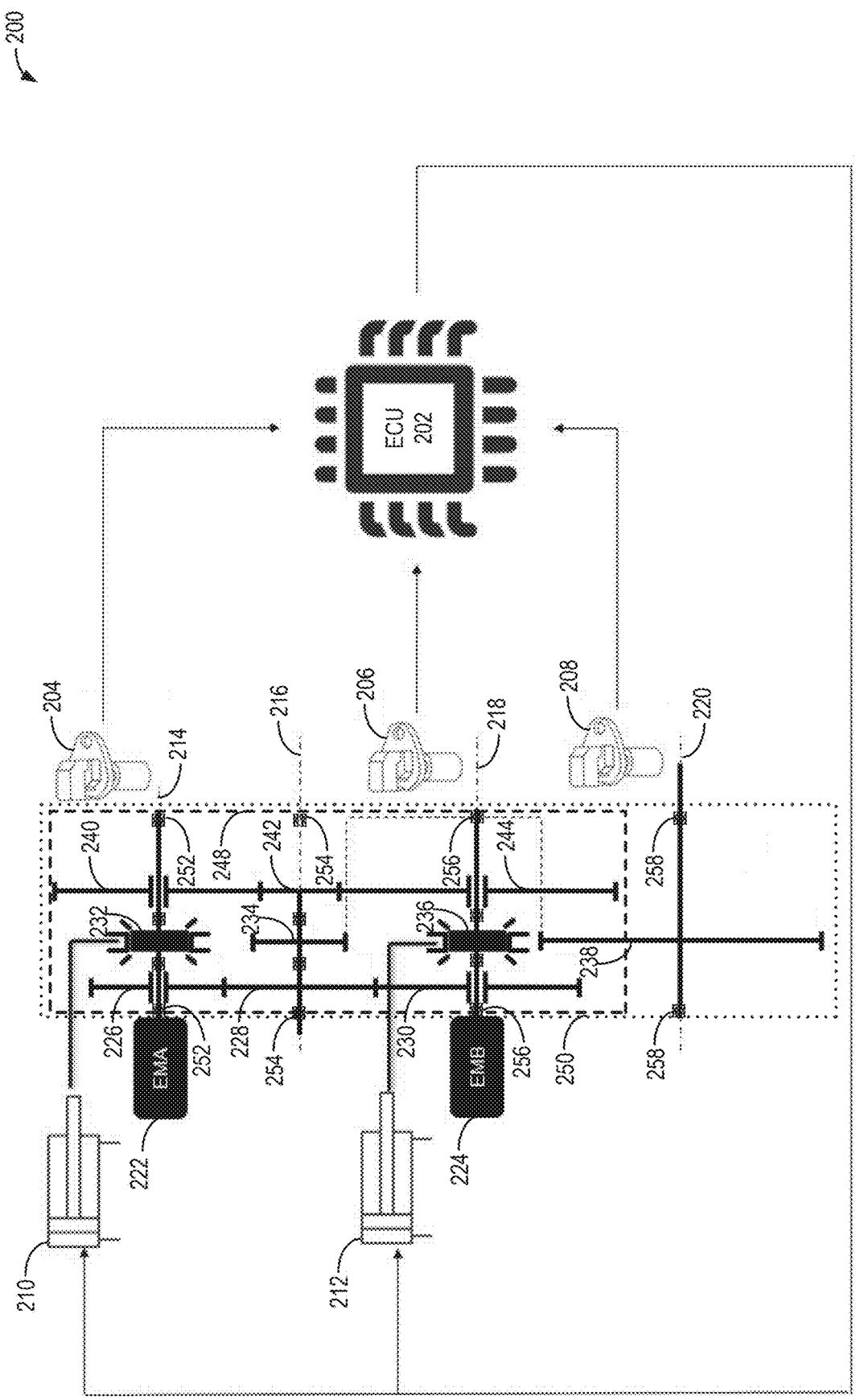
FIG. 2A shows a schematic of a 2-speed transmission system comprising a plurality of shafts and an intermediate shaft coupled to dual electric motors.

FIGS. 1A, 1B, and 2A show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As shown in FIG. 1A, a schematic depiction of a vehicle system 106 that can derive propulsion power from one or more electric motors 154 (e.g., a drive motor) is shown. In one embodiment, electric motors 154 may be one or more traction motors. Electric motors 154 may receive electrical power from a traction battery 158 to provide torque to rear vehicle wheels 155. Electric motors 154 may also be operated as a generator to provide electrical power to charge traction battery 158, for example, during a braking operation. It should be appreciated that while FIG. 1A depicts electric motors 154 mounted in a rear wheel drive configuration, other configurations are possible, such as employing electric motors 154 in a front wheel configuration, or in a configuration in which vehicle system 106 includes two electric motors, including a first electric motor mounted to a first shaft and a second electric motor mounted to a second shaft wherein power is transmitted to both the rear vehicle wheels 155 and front vehicle wheels 156 via an intermediate shaft with one end external to a gearbox housing.

Electric motors 154 may include a gearbox integrated therein or the gearbox can integrate the electric motors 154. Additionally or alternatively, the electric motors 154 may be coupled to an outside of a transmission/gearbox housing. The integrated gearbox may include one or more input speed reduction gear sets. Additionally or alternatively, vehicle system 106 may include multiple traction batteries configured to provide power to different driven wheels, wherein power to the wheels may be predicated based on traction at the wheels, driver demand, and other conditions. In one example, the vehicle system 106 may include a 2-speed schematic wherein there are an equal number of drive speeds.

FIG. 1B illustrates a control system 114 integrated within the vehicle system 106 of FIG. 1A. Controller 112 may form a portion of the control system 114. Control system 114 may receive information from a plurality of sensors 116 and send control signals to a plurality of actuators 181. As one example, the plurality of sensors 116 may include sensors such as a battery level sensor, clutch activation sensor, etc. As another example, the plurality of actuators 181 may include a clutch, among others. Controller 112 may send a signal to an actuator of the clutch(es) to engage or disengage the clutch(es), so as to couple or decouple power transmission from the electric motors 154 to the rear vehicle wheels 155 or the front vehicle wheels 156. The controller 112 may receive input data from the plurality of sensors 116, process the input data, and trigger the plurality of actuators 181 in response to the processed input data based on instruction or code programmed therein corresponding to one or more routines, and stored on a non-transitory memory.

Turning to FIG. 2A, a line diagram of an exemplary transmission system 200 is shown. The transmission system 200 may include a first electric motor 222 coupled to a first shaft 214 comprising a first gear mesh of a plurality of gear meshes, a third gear mesh of the plurality of gear meshes and a first low friction engaging device, such as a first dog clutch 232, between the first gear mesh and the third gear mesh. The transmission system 200 may also include a second electric motor 224 coupled to a second shaft 218 comprising a second gear mesh of the plurality of gear meshes, a fourth gear mesh of the plurality of gear meshes, and a second low friction engaging device, such as a second dog clutch 236, between the first gear mesh and second gear mesh. The transmission system 200 may further comprise an intermediate shaft 216 that may be oriented parallel to both of the first shaft 214 and the second shaft 218. In some embodiments, the first shaft 214, the intermediate shaft 216, and the second shaft 218 may be located on the same plane. As such, the intermediate shaft 216 may be located between the first shaft 214 and the second shaft 218. In other embodiments, the first shaft 214, the intermediate shaft 216, and the second shaft 218 may not be located on the same plane.

The first electric motor 222 is coupled to the first shaft 214 to enable a first reduction ratio of the first electric motor 222 via the first gear mesh and a second reduction ratio of the first electric motor 222 between the first shaft 214 and the intermediate shaft 216 via the third gear mesh. The second electric motor 224 is coupled to the second shaft to enable a first reduction ratio of the second electric motor 224 via the second gear mesh and a second reduction ratio of the second electric motor 224 via the fourth gear mesh between the second shaft 218 and the intermediate shaft 216.

Transmission system 200 may further include a control system comprising an electronic control unit (ECU) 202 that executes instructions that obtain signals from a plurality of sensors and adjusts one or more actuators via a controller to adjust the various components of the transmission system 200 to achieve a plurality of gearshifts. In all embodiments of the transmission system 200, the first electric motor 222 and the second electric motor 224 are not co-axial. However, the first electric motor 222 and the second electric motor 224 may be mounted on the same side of the transmission system 200 or on opposite sides of the transmission system 200. As shown in FIG. 2A, the first electric motor 222 and the second electric motor 224 are mounted on the same side of the transmission system 200.

The first gear mesh comprises a first gear 226 and a second gear 228 and the third gear mesh comprises a fourth gear 240 and a fifth gear 242. The second gear mesh comprises a third gear 230 and the second gear 228 and the fourth gear mesh comprises the fifth gear 242 and a sixth gear 244. The first gear 226, the third gear 230, the fourth gear 240, and the sixth gear 244 may be idler gears that are locked onto their respective shafts via at least one of the first low friction engaging device and the second low friction engaging device. The first low friction engaging device may be a first dog clutch 232 and the second low friction engaging device may be a second dog clutch 236. The first shaft 214 may be oriented parallel to the second shaft 218 and may have a different angular velocity at will than the second shaft when none of the idler gears are engaged, and vice versa.

In some embodiments, one end of the intermediate shaft 216 may be external to a gearbox housing to enable coupling to a driveline external to the gearbox housing in a configuration of the transmission system 200 wherein the first shaft 214 is coupled to the first gear 226 and the fourth gear 240, the intermediate shaft is coupled to the second gear 228 and the fifth gear 242, and the second shaft 218 is coupled to the third gear 230 and the sixth gear 244. In some embodiments, one end of the intermediate shaft 216 that may be external to the gearbox housing may transmit torque to axles to drive a set of vehicle wheels. The gearbox housing may enclose the components in the box 248 (e.g., dashed line). In particular, the gearbox housing may enclose the first shaft 214, the plurality of gears coupled to the first shaft 214, the intermediate shaft 216, the plurality of gears coupled to the intermediate shaft 216, the second shaft 218, the plurality of gears coupled to the second shaft 218, and a plurality of bearings. In some embodiments, the first electric motor 222 and the second electric motor 224 may be included in the gearbox housing.

As shown in FIG. 2A, the first gear 226 and the fourth gear 240 may be locked onto the first shaft 214 via the first dog clutch 232. Bearings 252, located at either end of the first shaft 214 and between the first gear 226 and the fourth gear 240, may support and facilitate rotation of the first shaft 214. Similarly, the third gear 230 and the sixth gear 244 may be locked onto the second shaft 218 via the second dog clutch 236. Bearings 256, located at either end of the second shaft 218 and between the third gear 230 and the sixth gear 244, may support and facilitate rotation of the second shaft 218. The second gear 228 and the fifth gear 242 are permanently locked to the intermediate shaft 216. Bearings 254, located at either end of the intermediate shaft 216 and between the second gear 228 and the fifth gear 242, may support and facilitate rotation of the intermediate shaft 216.

The first gear 226 coupled to the first shaft 214 and the third gear 230 coupled to the second shaft 218 are meshed onto the second gear 228 coupled to the intermediate shaft 216. The fourth gear 240 coupled to the first shaft 214 the sixth gear 244 coupled to the second shaft 218 are meshed onto the fifth gear 242 coupled to the intermediate shaft 216.

In some embodiments, the first reduction ratio of the first electric motor 222 exceeds the first reduction ratio of the second electric motor 224 and the second reduction ratio of the first electric motor 222 exceeds the second reduction ratio of the second electric motor 224. Such a configuration enables a speed of the first electric motor 222 to be greater than a speed of the second electric motor 224. In contrast, the first reduction ratio of the first electric motor is equal to the first reduction ratio of the second electric motor and the second reduction ratio of the first electric motor is equal to the second reduction ratio of the second electric motor in other embodiments.

In some embodiments wherein one end of the intermediate shaft 216 is not external to the gearbox housing and one end of a third shaft 220 is external to the gearbox housing to enable coupling to the driveline external to the gearbox housing, the transmission system further comprises the third shaft 220 coupled to a fifth gear mesh comprising a seventh gear 234 coupled to the intermediate shaft 216 and an eighth gear 238 permanently locked to the third shaft 220 to enable a third reduction ratio between the intermediate shaft 216 and the third shaft 220. The third shaft 220 may or may not integrate a differential, in other embodiments. Further, as shown in FIG. 2A, the third shaft 220 is oriented parallel to the first shaft 214, the second shaft 218, and the intermediate shaft 216. However, in other embodiments, the third shaft 220 may not be oriented parallel to the first shaft 214, the second shaft 218, and the intermediate shaft 216.

In one embodiment, the gearbox housing may enclose the components in the box 250 (e.g., dotted line). In particular, the gearbox housing may enclose the first shaft 214, the plurality of gears coupled to the first shaft 214, the intermediate shaft 216, the plurality of gears coupled to the intermediate shaft 216, and the second shaft 218, the plurality of gears coupled to the second shaft 218, the third shaft 220, the plurality of gears coupled to the third shaft 220, and a plurality of bearings. More specifically, the gearbox housing may enclose the same components in the box 248 in addition to the seventh gear 234 coupled to the intermediate shaft 216 and the eighth gear 238 coupled to the third shaft 220. Bearings 258, located at either end of the third shaft 220, may support and facilitate rotation of the third shaft 220.

The various configurations of the transmission system 200 described herein are advantageous due to utilizing less gears than present transmission systems. In this way, the configuration is simplified and the configuration space is reduced, which may decrease manufacturing costs and reduce the complexity of control systems used to achieve a desired performance of the transmission system 200. As described above, the transmission system 200 may include the control system comprising a plurality of sensors, one or more actuators, and an electronic control unit (ECU) 202 with instructions stored in at least one memory and executed by at least one processor of the ECU 202 to cause an adjustment of the one or more actuators based on data received by the plurality of sensors to perform gearshifts. The plurality of sensors may include speed sensors and clutch position sensors. The plurality of sensors may include a first sensor 204, a second sensor 206, and a third sensor 208.

In one embodiment, the first sensor 204, the second sensor 206, and the third sensor 208 may be speed sensors. In this way, the plurality of sensors may monitor at least a first shaft speed, a second shaft speed, and an intermediate shaft speed. For example, the first sensor 204 may monitor a speed of the first shaft 214, the second sensor 206 may monitor a speed of the intermediate shaft 216, and the third sensor 208 may monitor a speed of the second shaft 218. In other embodiments, the first shaft speed may be inferred by the speed of the first electric motor 222, the second shaft speed may be inferred by the speed of the second electric motor 224, and the intermediate shaft speed may be inferred by the vehicle speed based on the configuration of the plurality of gears coupled to the intermediate shaft 216.

Alternatively, the first shaft 214 speed may be provided by a CAN message from an inverter of the first electric motor 222 and the second shaft 218 speed may be provided by a CAN message from an inverter of the second electric motor 224. The one or more actuators may be hydraulic actuators, electric actuators, linear actuators, or drum selectors, for example. The one or more actuators may include a first actuator 210 and a second actuator 212. In one embodiment, the transmission system 200 may include a single actuator, such as when operating a barrel cam device.

In some embodiments, the first gear 226, the third gear 230, the fourth gear 240, and the sixth gear 244 may be engaged or disengaged by at least one actuator in the one or more actuators to enable various configurations of the transmission system 200. As one example, the first actuator 210 may be communicatively coupled to the first shaft 214 to engage or disengage the first gear 226 or the fourth gear 240 via the first dog clutch 232. Either both or at least one of the first actuator 210 and the second actuator 212 may be communicatively coupled to the second shaft 218 to disengage or engage the third gear 230 or the sixth gear 244 via the second dog clutch 236. In another embodiment, wherein one end of the intermediate shaft 216 is not external to the gearbox housing and at least one end of the third shaft 220 is external to the gearbox housing to enable coupling to a driveline external to the gearbox housing, the eighth gear 238 coupled to the third shaft 220 is engaged with the seventh gear 234 coupled to the intermediate shaft 216.

By utilizing dog clutches and other low friction engaging devices to disengage and engage the plurality of gears, power efficiency losses due to high drag torque related to the presence of clutches, such as in a dual-clutch transmission, may be decreased. In particular, one advantage of utilizing low friction engaging devices and not, for example, wet clutches, is power loss reduction. In this way, seamless gearshifts with null torque interruption, as described below with regards to FIGS. 2A-4, may be performed without the power efficiency losses experienced with seamless shifting in other transmission systems.

FIG. 2B shows a table 201 that illustrates a plurality of transmission drive ranges and corresponding states of the first electric motor 222 and the second electric motor 224. The plurality of transmission drive ranges and corresponding states of the first electric motor 222 and the second electric motor 224 may be realized via the control system described herein. The table 201 includes a first column 260, a second column 262, and a third column 264. The first column 260 may include the plurality of transmission drive ranges, the second column 262 includes the state of the first electric motor 222 for the plurality of transmission drive ranges, and the third column 264 includes the state of the second electric motor 224 for the plurality of transmission drive ranges. The plurality of transmission drive ranges includes a first transmission drive range DRNN, a second transmission drive range DR11, a third transmission drive range DRN1, a fourth transmission drive range DR21, a fifth transmission drive range DR2N, a sixth transmission drive range DR22, and a seventh transmission drive range DRN2.

The plurality of transmission drive ranges described above may be based on a plurality of states of the first electric motor and a plurality of states of the second electric motor. For example, the plurality of states of the first electric motor 222 may include a neutral state, a first speed of the first electric motor 222, and a second speed of the first electric motor 222. Similarly, the plurality of states of the second electric motor 224 may include a neutral state, a first speed of the second electric motor 224, and a second speed of the second electric motor 224.

As one example, the first transmission drive range DRNN may comprise the first electric motor 222 being in the neutral state and the second electric motor 224 being in the neutral state. The second transmission drive range DR11 may comprise the first electric motor 222 operating at the first speed of the first electric motor 222 and the second electric motor 224 operating at the first speed of the second electric motor 224. The third transmission drive range DRN1 may comprise the first electric motor 222 being in the neutral state and the second electric motor 224 operating at the first speed of the second electric motor 224. The fourth transmission drive range DR21 may comprise the first electric motor 222 operating at the second speed of the first electric motor 222 and the second electric motor 224 operating at the first speed of the second electric motor 224.

The fifth transmission drive range DR2N may comprise the first electric motor 222 operating at the second speed of the first electric motor 222 and the second electric motor 224 being in the neutral state. The sixth transmission drive range DR22 may comprise the first electric motor 222 operating at the second speed of the first electric motor 222 and the second electric motor 224 operating at the second speed of the second electric motor 224. The seventh transmission drive range DRN2 may comprise the first electric motor 222 being in the neutral state and the second electric motor 224 operating at the second speed of the second electric motor 224.

A first configuration of the first shaft 214 may enable the first speed of the first electric motor 222, a second configuration of the first shaft 214 may enable the second speed of the first electric motor 222, and a third configuration of the first shaft 214 may enable the neutral state of the first electric motor 222 Similarly, a first configuration of the second shaft 218 may enable the first speed of the second electric motor 224, a second configuration of the second shaft 218 may enable the second speed of the second electric motor 224, and a third configuration of the second shaft 218 may enable the neutral state of the second electric motor 224.

Figure 3:
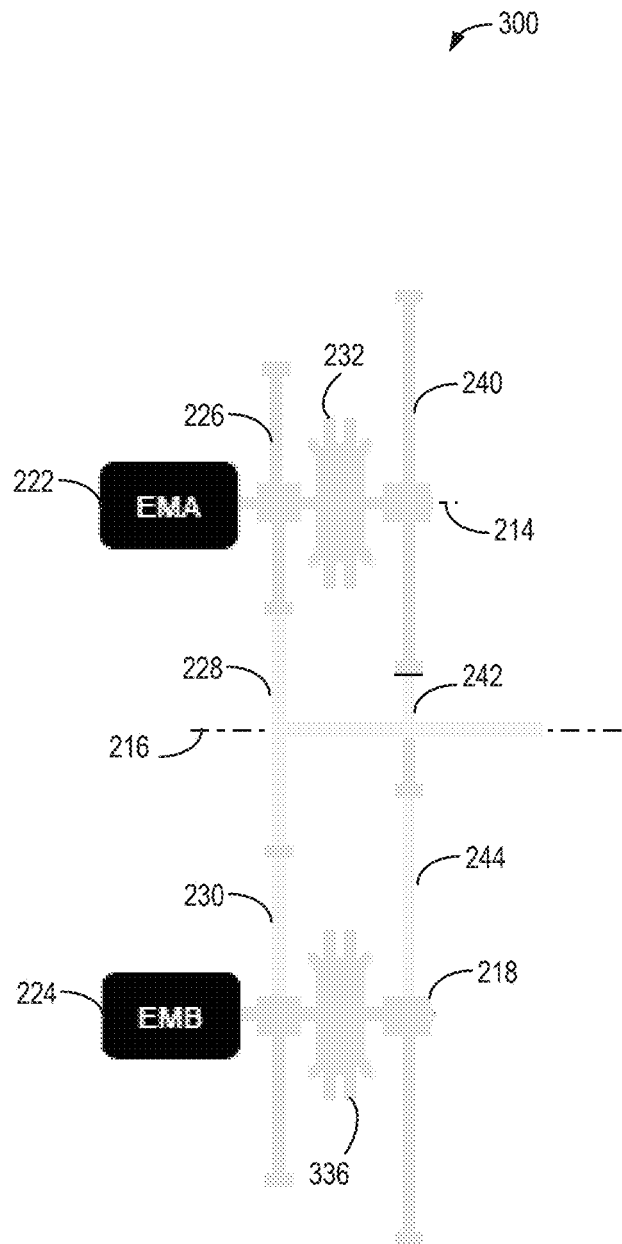
FIGS. 3-9 show a plurality of power paths to achieve a plurality of transmission drive ranges.
Figure 4:
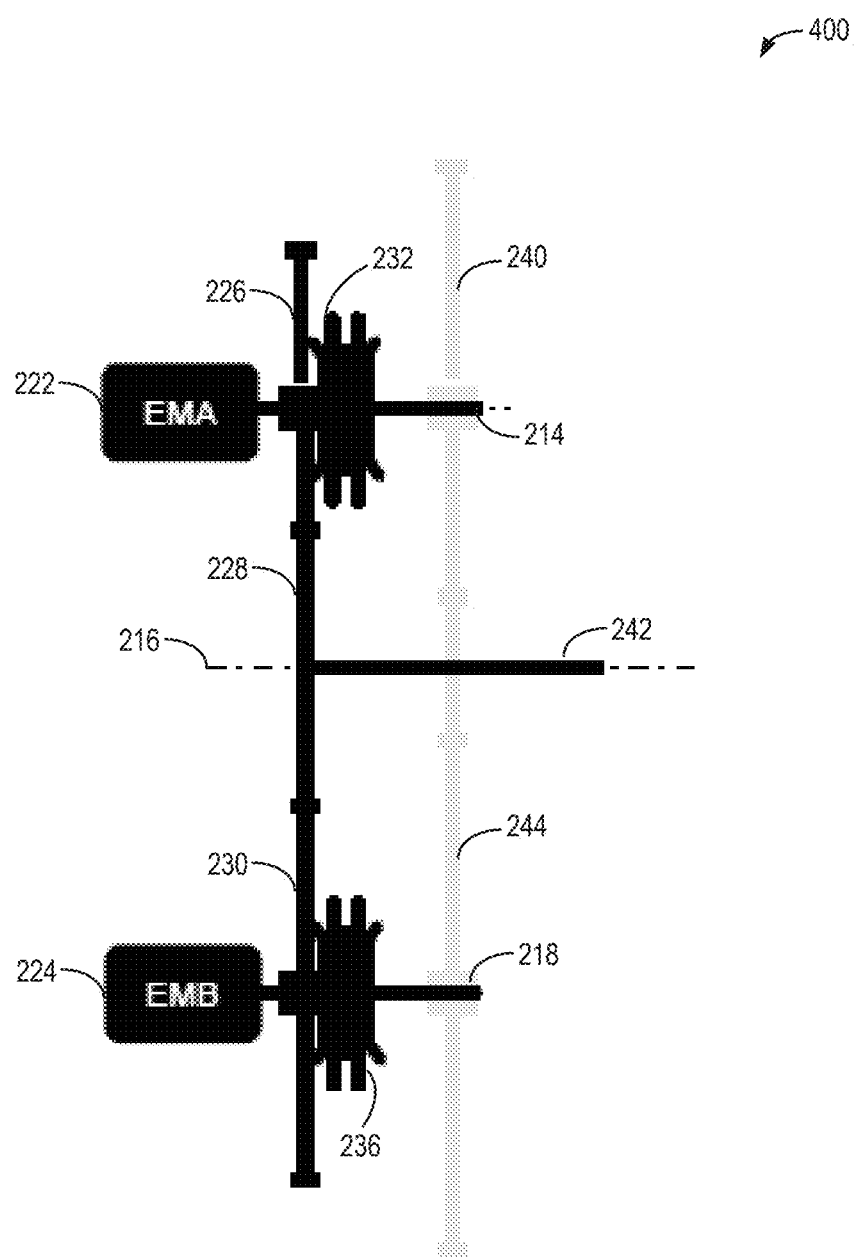
Figure 5:
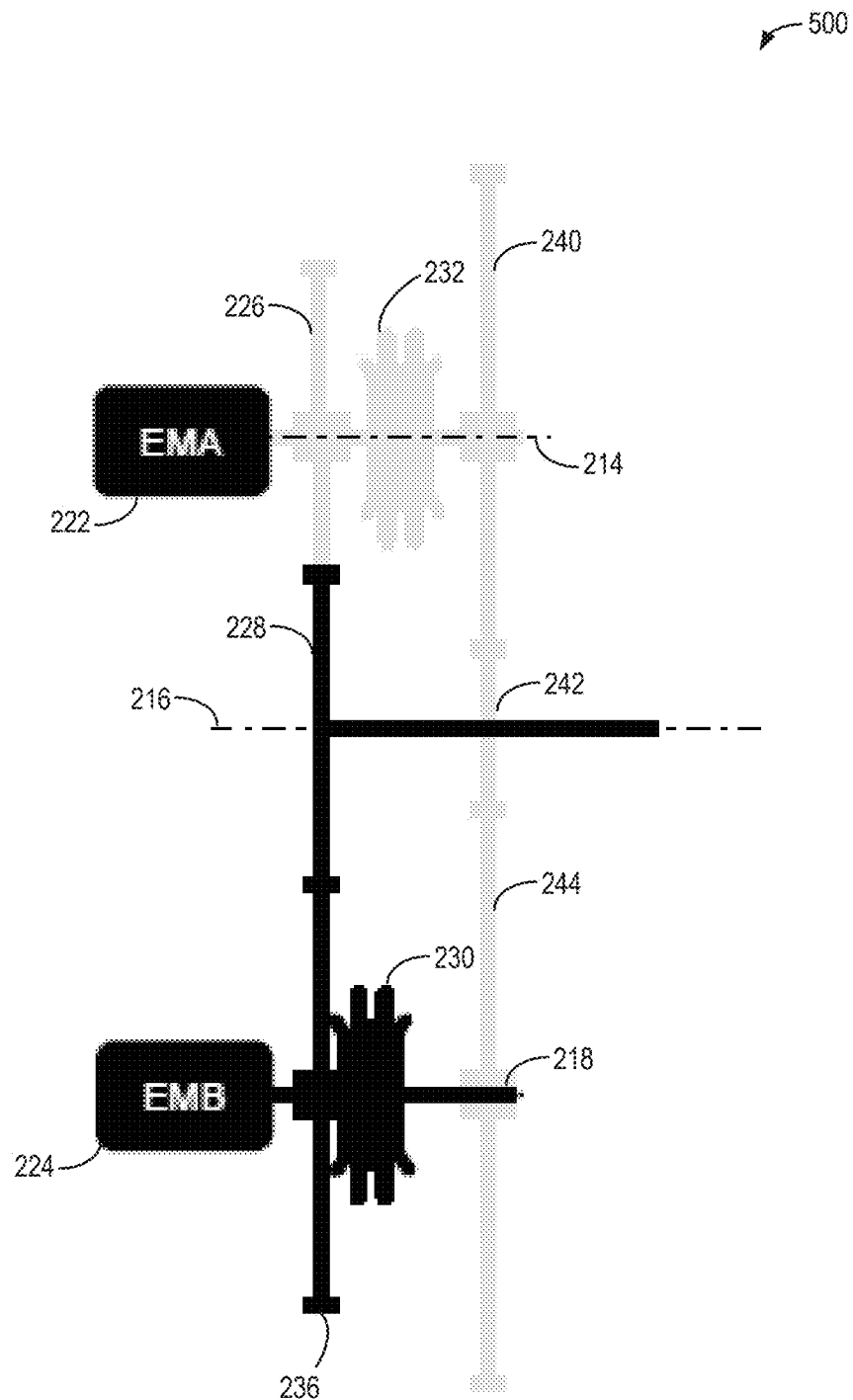
Figure 6:
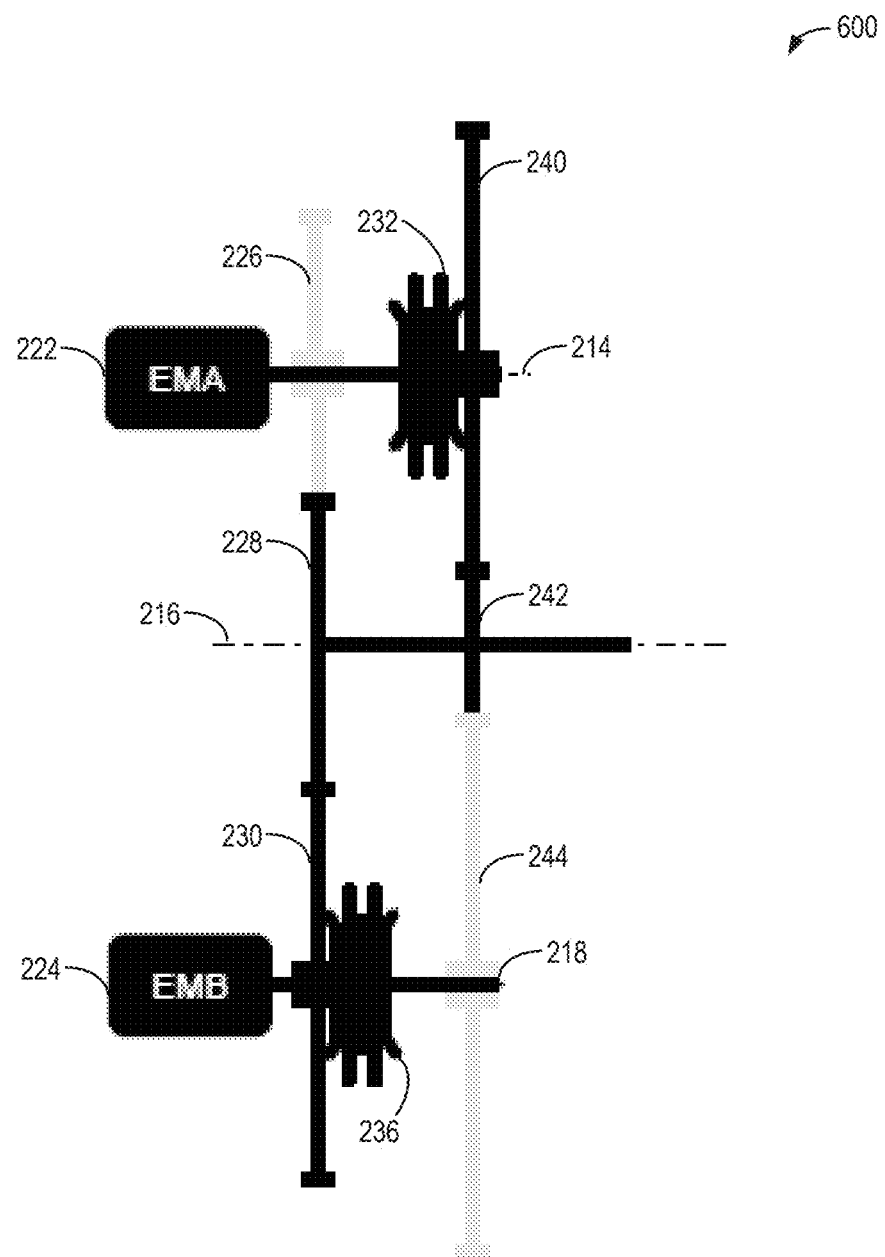
Figure 7:
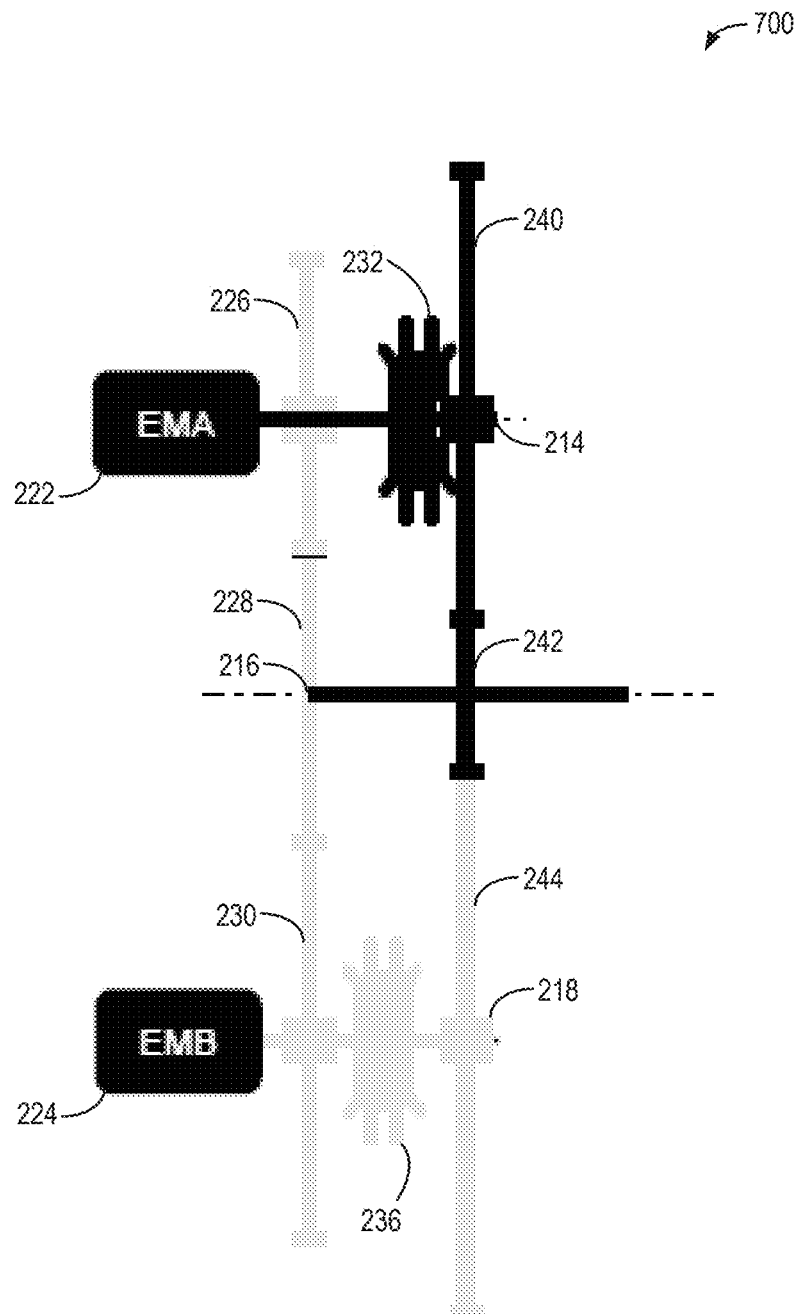
Figure 8:
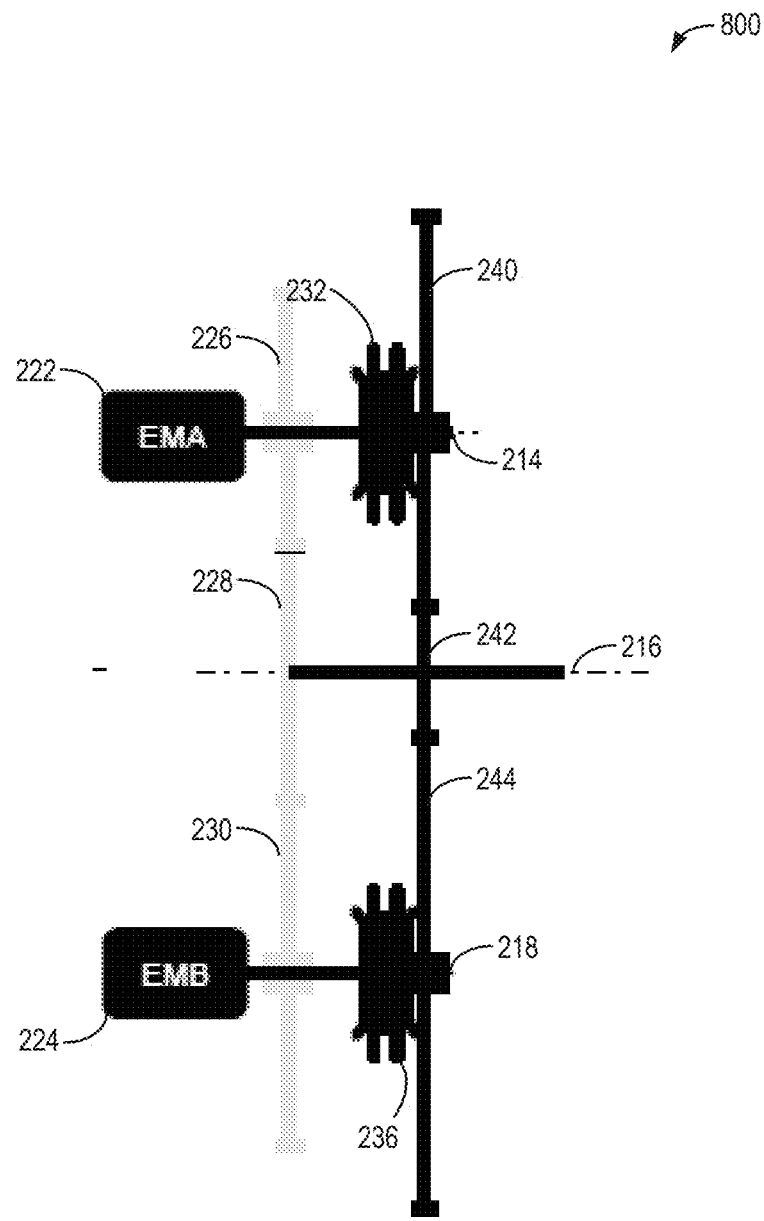
Figure 9:
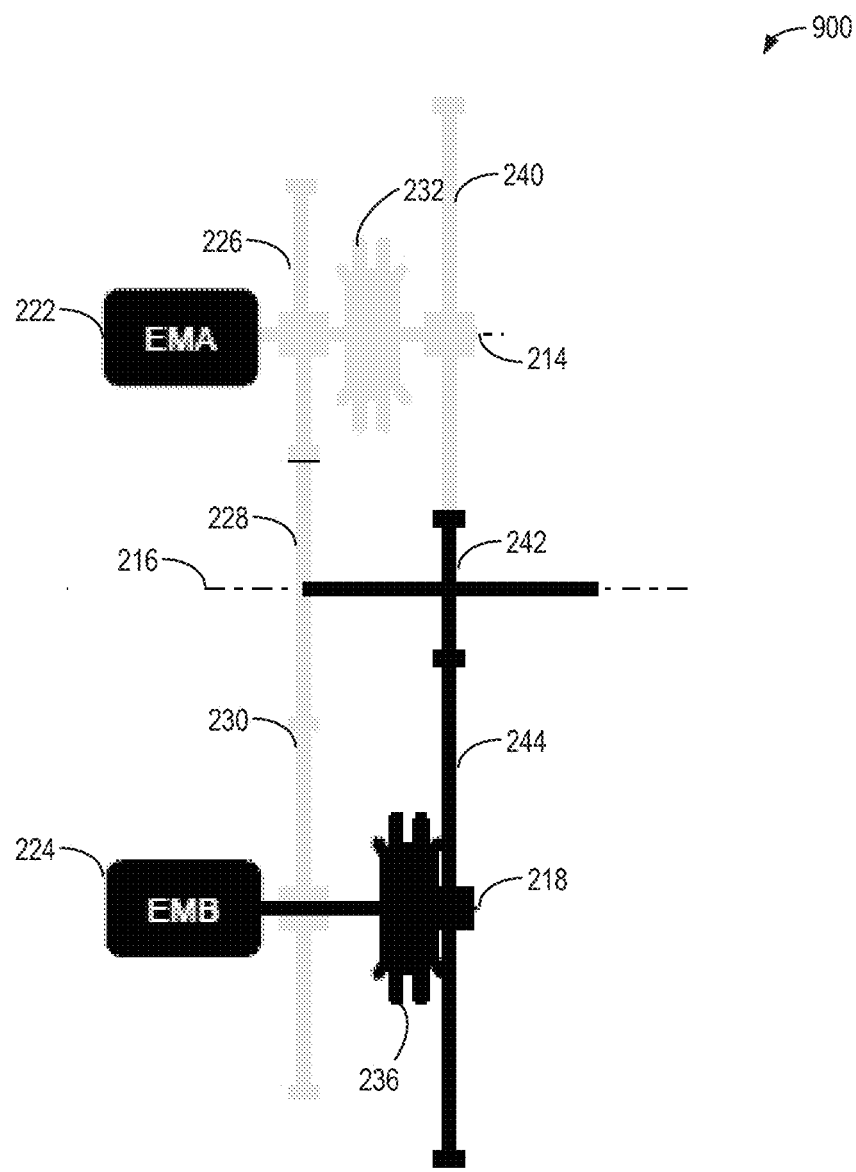

Different combinations of the configurations of the first electric motor 222 and the second electric motor 224 may be result in different power paths of the transmission system 200. FIGS. 3-9 illustrate a plurality of power paths of the transmission system 200. The plurality of power paths may include a first power path 300 as illustrated in FIG. 3, a second power path 400 as illustrated in FIG. 4, a third power path 500 as illustrated in FIG. 5, a fourth power path 600 as illustrated in FIG. 6, a fifth power path 700 as illustrated in FIG. 7, a sixth power path 800 as illustrated in FIG. 8, and a seventh power path 900 as illustrated in FIG. 9. The first power path 300 may result in operating a vehicle in the first transmission drive range DRNN, the second power path 400 may result in operating the vehicle in the second transmission drive range DR11, the third power path 500 may result in operating the vehicle in the third transmission drive range DRN1, the fourth power path 600 may result in operating the vehicle in the fourth transmission drive range DR21, the fifth power path 700 may result in operating the vehicle in the fifth transmission drive range DR2N, the sixth power path 800 may result in operating the vehicle in the sixth transmission drive range DR22, and the seventh power path 900 may result in operating the vehicle in the seventh transmission drive range DRN2.

The first power path 300 may be enabled via the third configuration of the first shaft 214 and the third configuration of the second shaft 218. The second power path 400 may be enabled via the first configuration of the first shaft 214 and the first configuration of the second shaft 218. The third power path 500 may be enabled via the third configuration of the first shaft 214 and the first configuration of the second shaft 218. The fourth power path 600 may be enabled via the second configuration of the first shaft 214 and the first configuration of the second shaft 218. The fifth power path 700 may be enabled via the second configuration of the first shaft 214 and the third configuration of the second shaft 218. The sixth power path 800 may be enabled via the second configuration of the first shaft 214 and the second configuration of the second shaft 218. The seventh power path 900 may be enabled via the third configuration of the first shaft 214 and the second configuration of the second shaft 218.

In particular, the plurality of configurations includes gears, shafts, and dog clutches that are engaged, such as the plurality of gears, dog clutches, and shafts colored black in the various power paths. Additionally, the plurality of configurations includes gears, shafts, and dog clutches that are not engaged, such as the plurality of gears, dog clutches, and shafts colored light grey in the various power paths. For example, the first configuration of the first shaft 214 may comprise engaging the first gear 226 and disengaging the fourth gear 240 via the first dog clutch 232 via at least one of the one or more actuators to enable a first speed of the first electric motor 222. The second configuration of the first shaft 214 may comprise disengaging the first gear 226 and engaging the fourth gear 240 via the first dog clutch 232 via at least one of the one or more actuators to enable a second speed of the first electric motor 222. Finally, the third configuration of the first shaft 214 may comprise disengaging the first gear 226 and disengaging the fourth gear 240 via the first dog clutch 232 via at least one of the one or more actuators to enable the first electric motor 222 to enter a neutral state.

Further, the first configuration of the second shaft 218 may comprise engaging the third gear 230 and disengaging the sixth gear 244 via the second dog clutch 236 via at least one of the one or more actuators to enable a first speed of the second electric motor 224. The second configuration of the second shaft 218 may comprise disengaging the third gear 230 and engaging the sixth gear 244 via the second dog clutch 236 via at least one of the one or more actuators to enable a second speed of the second electric motor 224, and a third configuration of the second shaft 218 may comprise disengaging the third gear 230 and disengaging the sixth gear 244 via the second dog clutch 236 via at least one of the one or more actuators to enable the second electric motor 224 to enter a neutral state.

Control of the first electric motor 222 and the second electric motor 224 may increase due to the advantageous placement of the plurality of dog clutches. In particular, due to the first dog clutch 232 and the second dog clutch 236 engaging and disengaging gears on the plurality of shafts directly coupled, and not indirectly coupled, to the first electric motor 222 and the second electric motor 224, changes in gear engagement may directly affect performance of the first electric motor 222 and the second electric motor 224. In this way, the gear engagement and disengagements may directly, rather than indirectly, affect the speed of and traction produced by the first electric motor 222 and the second electric motor 224.

Figure 10:
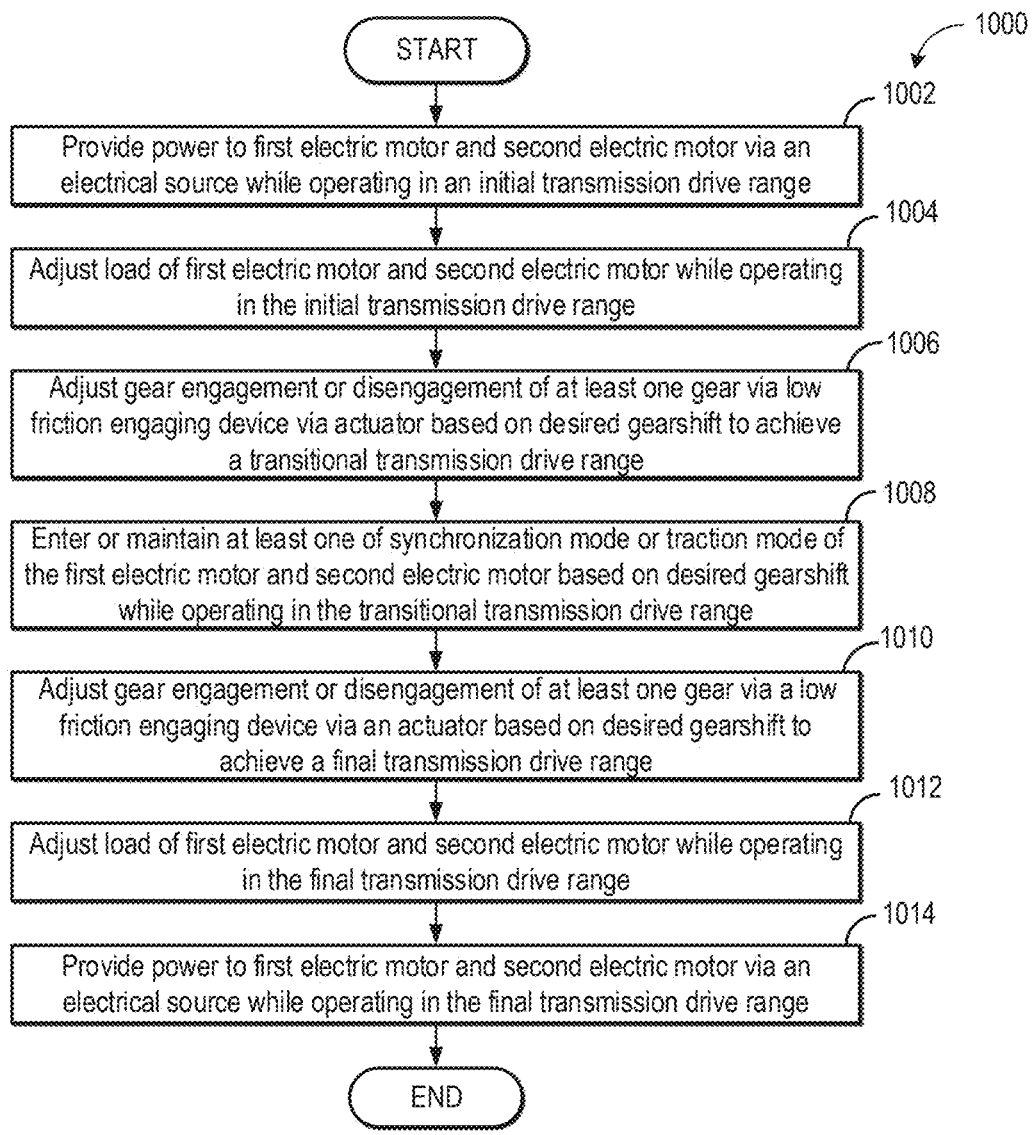
FIG. 10 shows a control method for implementing gearshifts via the 2-speed transmission system.

FIG. 10 shows a method 1000 for controlling an operation mode of a first electric motor and a second electric motor to realize a plurality of transmission drive ranges via a plurality of gearshifts. Method 1000 will be described with relation to the systems shown in FIGS. 1A-2A, but it should be understood that similar methods may be used with other systems without departing from the scope of this disclosure. Instructions for carrying out method 300 may be executed by an electronic control unit (ECU) (such as ECU 202 of FIG. 2A) based on instructions stored on a memory of a controller and in conjunction with signals received from sensors of the system, such as the sensors described above with reference to FIG. 2A. The ECU may employ actuators of the system to adjust a plurality of low friction engaging devices, according to the methods described below.

At 1002, the method 1000 includes providing power to the first electric motor and the second electric motor via a power source while operating in an initial transmission drive range. Electrical power may be provided independently to the first electric motor and the second electric motor via the power source(s). The power source may be a battery, such as the traction battery described above with respect to FIG. 1A. In this way, an electric current may be supplied to the first electric motor and the second electric motor to power the motors. While power is supplied to the first electric motor and the second electric motor, a transmission system (e.g., transmission system 200 of FIG. 2A) may operate in the initial transmission drive range. The initial transmission drive may include one amongst the second transmission drive range DR11, the fourth transmission drive range DR21, and the sixth transmission drive range DR22 of the plurality of transmission drive ranges discussed above with respect to FIG. 2B. The initial transmission drive range may be considered a transmission drive range prior to either one or a series of gearshifts, such as downshifts or upshifts, to achieve a different transmission drive range.

At 1004, the method 1000 incudes adjusting load of the first electric motor and the second electric motor while operating in the initial transmission drive range. In some embodiments, the load may be decreased (unloaded), such that there may be a decrease in current drawn from the power source. In other embodiments, the load may be increased via increasing current drawn from the power source. For example, before performing a gearshift to achieve a different transmission drive range, the first electric motor may be loaded whereas the second electric motor may be unloaded. As such, torque for the second electric motor may be reduced and the torque for the first electric motor may be increased to offset the decrease in torque for the second electric motor while performing the gearshift. In this way, seamless shifting may be enabled via the over-torque capability of the electric motors. Since no gearshifts were performed, the initial transmission drive range is maintained when loading and unloading the first electric motor and the second electric motor.

At 1006, the method 1000 includes adjusting gear engagement and disengagement of at least one gear via a low friction engaging device via an actuator based on a desired gearshift to achieve a transitional transmission drive range. The transitional transmission drive range may include one of the transmission drive ranges wherein at least one of the two motors is in the neutral state, namely the first transmission drive range DRNN, the third transmission drive range DRN1, the fifth transmission drive range DR2N, and the seventh transmission drive range DRN2 of the plurality of transmission drive ranges described above with respect to FIG. 2B. To enable the transitional transmission drive range, at least one gear in one of a gear mesh of the first electric motor or a gear mesh of the second electric motor may be engaged or disengaged based on whether the gear was originally disengaged or engaged.

In a first example, with the second electric motor not in a neutral state, the gear in the gear mesh of the first electric motor may originally be engaged, indicating that the first electric motor is operating at either a first speed or second speed of the first electric motor as described herein. By disengaging the gear in the gear meshes of the first electric motor, the first electric motor enters a neutral state and the whole system enters a transitional transmission drive range. In a second example, with the first electric motor not in a neutral state, the gear in the gear mesh of the second electric motor may originally be engaged, indicating that the second electric motor is operating at either a first speed or second speed of the second electric motor as described herein. By disengaging the gear in the gear meshes of the second electric motor, the second electric motor enters a neutral state and the whole system enters a transitional transmission drive range.

At 1008, the method 1000 includes entering or maintaining at least one of a synchronization mode or traction mode of the first electric motor and second electric motor based on the desired gearshift while operating in the transitional transmission drive range. The synchronization mode is an operation mode for speed control and the traction mode is an operation mode for torque control. With regards to the traction mode, the traction mode may ensure that the desired torque is produced during operation. In particular, load of either the first electric motor or second electric motor is maintained or adjusted to enable desired torque production by the first electric motor and the second electric motor or adjusted to compensate for decreases in torque of one of the first electric motor or the second electric motor.

With respect to the synchronization mode, the respective electric motor speed may be decelerated or accelerated until a speed difference between the desired gear and the respective shaft coupled to the electric motor is within a pre-determined speed threshold. To achieve a speed within the pre-determined speed threshold, the speed of the respective electric motor (e.g., one of the first electric motor or the second electric motor) is decelerated or accelerated. Gear speed is determined by vehicle speed and cannot be controlled while shifting. Thus, the synchronization is realized by adjusting the speed of the respective motor instead of a mechanical synchronizer(s). However, other embodiments of the present disclosure may include the mechanical synchronizer(s) to increase efficiency of synchronization.

In some embodiments, both the first electric motor and the second electric motor may operate in the traction mode for the majority of operation and enter the synchronization mode when gearshifts are performed to change the speed of the respective motor. Returning to the first example described wherein the gear in the gear mesh of the first electric motor may originally be engaged and the gearshift caused the first electric motor to enter the neutral state and the transitional transmission drive range. After performing the gear shift, the first electric motor may enter the synchronization mode while the second electric motor, which did not experience a gearshift, may maintain operation in the traction mode. Turning to the second example wherein all the gears in the gear meshes of the second electric motor may originally be disengaged and the gearshift caused the second electric motor to begin operating at the first speed of the second electric motor in the transitional transmission drive range. Similarly, after performing the gearshift, the second electric motor may enter the synchronization mode while the first electric motor, which did not experience a gearshift, may maintain operation in the traction mode.

At 1010, the method 1000 includes adjusting gear engagement and disengagement of at least one gear via an actuator based on a desired gearshift to achieve a final transmission drive range. The final transmission drive range may include one amongst the second transmission drive range DR11, the fourth transmission drive range DR21, and the sixth transmission drive range DR22 of the plurality of transmission drive ranges described above with respect to FIG. 2B. To enable the final transmission drive range, at least one gear in one of a gear mesh of the first electric motor or a gear mesh of the second electric motor may be engaged or disengaged based on whether the gear was originally disengaged or engaged.

Returning to the first example above wherein the gear in the gear mesh of the first electric motor may originally be engaged and the gearshift caused the first electric motor to enter the neutral state and the transitional transmission drive range. After entering the synchronous mode, a subsequent gearshift may be performed by engaging the gear to enable either the first speed or the second speed of the first electric motor depending on whether the first electric motor was originally operating at the second speed or first speed of the first electric motor. In this way, the final transmission drive range may be achieved via the gearshift.

Turning to the second example wherein the gear in the gear mesh of the second electric motor may originally be engaged and the gearshift caused the second electric motor to enter the neutral state and the transitional transmission drive range. After entering the synchronous mode, a subsequent gearshift may be performed by engaging the gear to enable either the first speed or the second speed of the second electric motor depending on whether the second electric motor was originally operating at the second speed or first speed of the second electric motor. In this way, the final transmission drive range may be achieved via the gearshift. After all the gearshifts are performed for either the first electric motor or the second electric motor, the first electric motor or the second electric motor may exit the synchronization mode and return to the traction mode.

At 1012, the method 1000 includes adjusting load of the first electric motor and the second electric motor while operating in the final transmission drive range. The loads of the first electric motor may be adjusted once all the gearshifts have been performed and operation of the first electric motor and the second electric motor returns to the traction mode. The load may be decreased (unloaded), such that there may be a decrease in current drawn from the power source by the first electric motor or the second electric motor. Further, the load may be increased, such that there may be an increase in current drawn from the power source by the first electric motor or second electric motor.

Turning to the first example described above, the gear engagement and disengagement of the gear mesh of the second electric motor was maintained throughout the gearshifts. As such, the current supplied to the second motor was increased to compensate for the torque reduction of the first electric motor as gearshifts were performed. After completion of the gearshifts, the second electric motor may be unloaded whereas the first electric motor may be loaded, such that torque produced by the first electric motor and the second electric motor is consistent with the torque requested by the vehicle or pedal position. Since no gearshifts were performed, the final transmission drive range is maintained when loading and unloading the first electric motor and the second electric motor.

At 1014, the method 1000 includes providing power to the first electric motor and the second electric motor while operating in the final transmission drive range. Electrical power may be provided independently to the first electric motor and the second electric motor via the power source(s). In this way, an electric current may be supplied to the first electric motor and the second electric motor to power the motors while operating in the final transmission drive range. The method 1000 ends.

It may be understood that other embodiments of the method 1000 may depart from the above without departing from the scope of the disclosure. For example, in embodiments wherein the speed of the first electric motor exceeds the speed of the second electric motor, the first electric motor will reach an overspeed limit prior to the second electric motor. Accordingly, the method 300 may include the first electric motor being disconnected via entering the neutral state to avoid overspeeding of the first electric motor when a vehicle is operating in a transmission drive range wherein both the first electric motor and the second electric motor are operating at the second speed and a nominal speed of the vehicle is exceeded. In this way, the integrity of the first electric motor is maintained.

Figure 11:
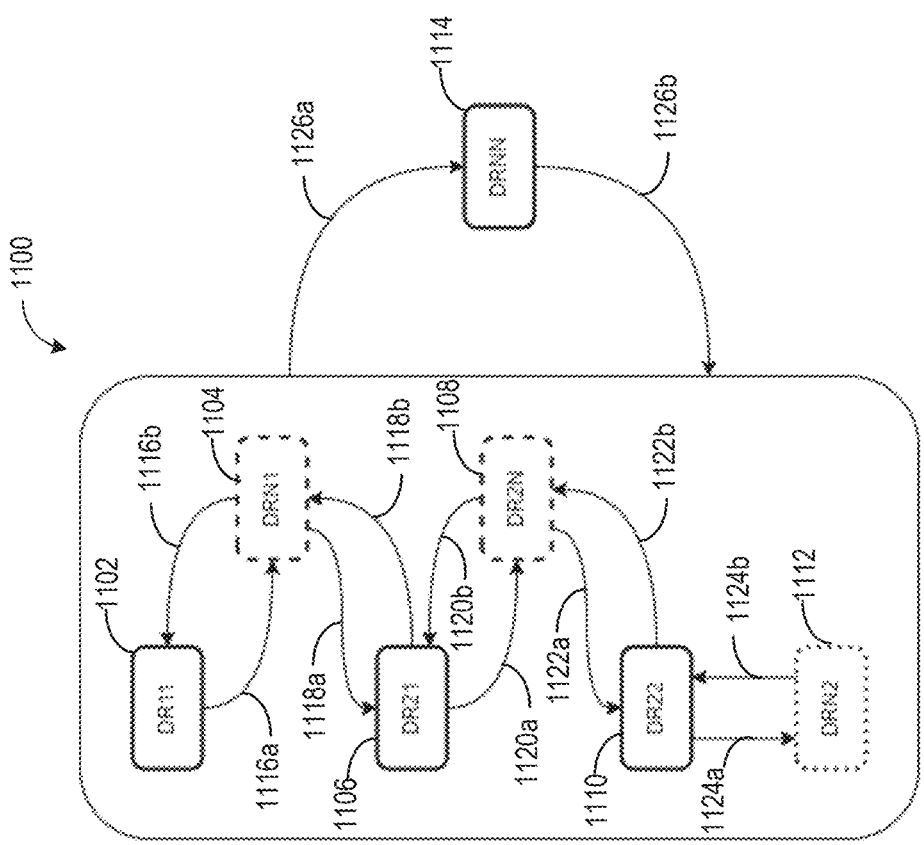
FIG. 11 shows a flow diagram for implementing gearshifts via the 2-speed transmission system.

FIG. 11 shows a flow diagram 1100 for implementing a plurality of gearshifts to realize transitional transmission drive ranges and final transmission drive ranges for a transmission system. As illustrated in FIG. 11, boxes with solid lines denote initial transmission drive and final transmission drive ranges, boxes with dashed lines denote transitional transmission drive ranges, and boxes with dotted lines denote optional transmission drive ranges. A transmission system may operate in plurality of transmission drive ranges as described above, including the first transmission drive range DRNN, the second transmission drive range DR11, the third transmission drive range DRN1, the fourth transmission drive range DR21, the fifth transmission drive range DR2N, the sixth transmission drive range DR22, and the seventh transmission drive range DRN2 as described herein. The gearshifts may be performed according to the systems and methods described herein in with respect to FIGS. 2A-10.

Depending on the series of gearshifts, the following plurality of transmission drive ranges, including the second transmission drive range DR11, the fourth transmission drive range DR21, and the sixth transmission drive range DR22, may be considered initial transmission drive ranges and final transmission drive ranges. Similarly, the following plurality of transmission drive ranges, including the first transmission drive range DRNN, the third transmission drive range DRN1, the fifth transmission drive range DR2N, and the seventh transmission drive range DRN2, may be considered transitional transmission drive ranges.

At box 1102, a transmission system, such as the transmission system 200 described above with respect to FIG. 2A, may be in an initial transmission drive range such as the second transmission drive range DR11. A gearshift 1116a may enable the transmission system to obtain a first transitional transmission drive range at box 1104, such as the third transmission drive range DRN1 for example. As shown, a gearshift 1116b may enable the transmission system to return to the second transmission drive range DR11 from the third transmission drive range DRN1. In this way, the second transmission drive range DR11 may be considered the initial transmission drive range in the gearshift 1116a and the final transmission drive range in the gearshift 1116b.

At box 1106, the transmission system may enter the fourth transmission drive range DR21 via a gearshift 1118a. As illustrated, a gearshift 418b may enable the transmission system to return to the first transitional transmission drive range (e.g., the third transmission drive range DRN1) from the fourth transmission drive range DR21. At box 1108, the transmission system may enter the fifth transmission drive range DR2N via a gearshift 1120a. The fifth transmission drive range DR2N may be considered a second transitional transmission drive range. As illustrated, a gearshift 1120b may enable the transmission system to return to the fourth transmission drive range DR21 from the fifth transmission drive range DR2N.

At box 1110, the transmission system may enter the sixth transmission drive range DR22 via a gearshift 1122a. As illustrated, a gearshift 1122b may enable the transmission system to return to the second transitional transmission drive range (e.g., the fifth transmission drive range DR2N) from the sixth transmission drive range DR22. At box 1112, the transmission system may optionally enter an overspeed management mode wherein, as described herein with respect to FIG. 10, a first electric motor may be disconnected to prevent overspeeding of the first electric motor. Accordingly, the transmission system may enter an optional transmission drive range (e.g., the sixth transmission drive range DRN2) via a gearshift 1124a. As illustrated, a gearshift 1124b may enable the transmission system to return to the sixth transmission drive range DR22 from the seventh transmission drive range DRN2.

In some embodiments, the first transmission drive range DRNN may be an initial transmission drive range and final transmission drive range for any of the transitional transmission drive ranges described above. For example, the transmission system may enter the first transmission drive range DRNN via a gearshift 1126a at box 1114. As such the transmission system may have originally been operating in a different transitional transmission drive range and the gearshift 1126a allowed the transmission system to operate in the first transmission drive range DRNN. In this way, the first transmission drive range DRNN may act as a final transmission drive range. Additionally, the first transmission drive range DRNN may act as an initial transmission drive range. As one example, a different transitional transmission drive range may be enabled via a gearshift 1126b. In this way, the transmission system may originally be operating in an initial transmission drive range (e.g., the first transmission drive range DRNN) prior to the gearshift 1126b.

Figure 12:
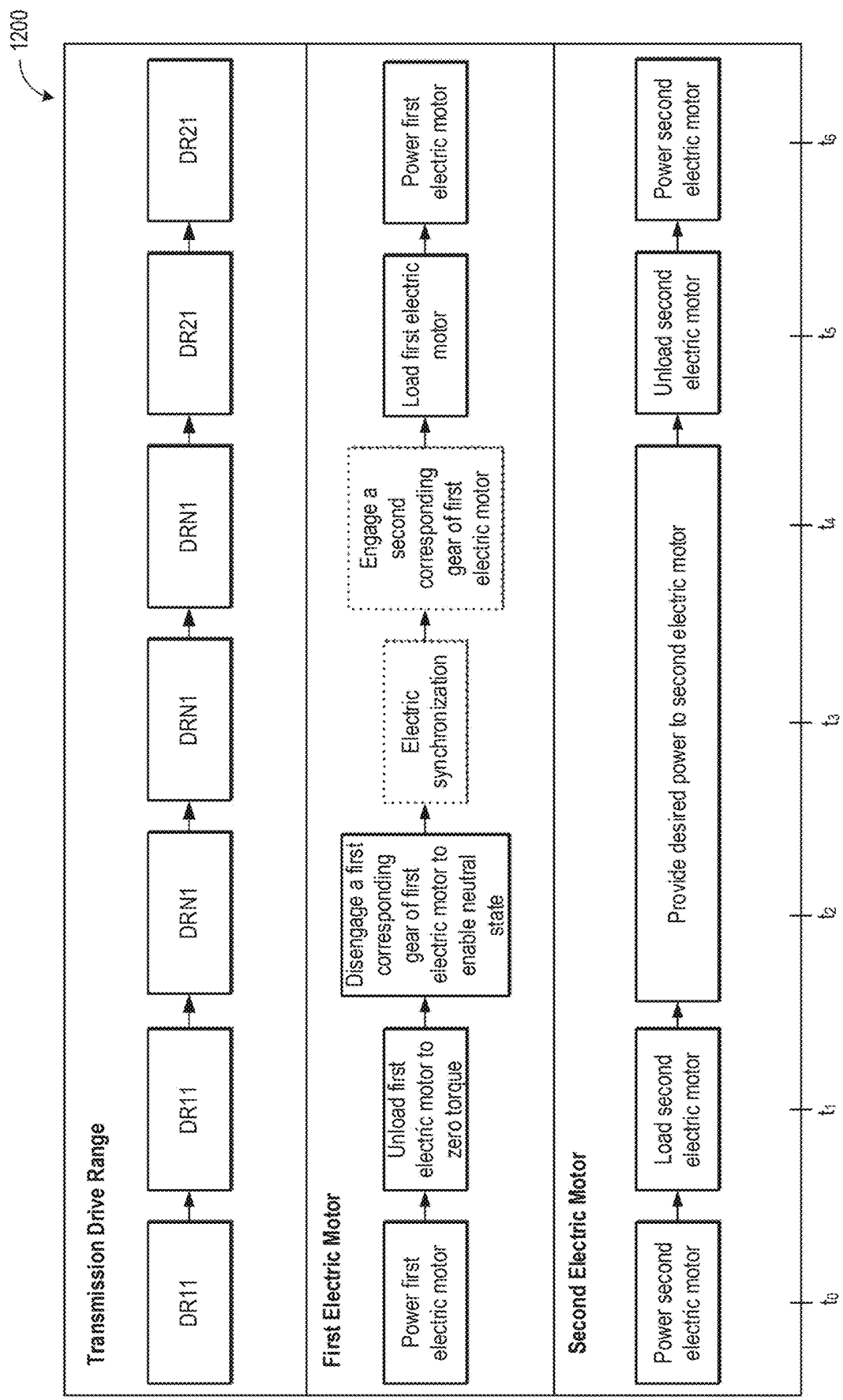
FIG. 12 shows a timing diagram for implementing the control method to perform gearshifts to realize a transmission drive range.

Turning to FIG. 12, a timing diagram 1200 wherein the control method as described herein is applied to a first electric motor and a second electric motor to achieve a transmission drive range via a plurality of gearshifts. At a time $t_0$, a vehicle is originally operating at an initial transmission drive range DR11 wherein the first electric motor is operating at a first speed in traction mode (e.g., indicated by solid lines) and the second electric motor is operating at a second speed in traction mode (e.g., indicated by solid lines). Further, the first electric motor and the second electric motor are powered by a power source(s). The vehicle continues to operate at the transmission drive range DR11 and traction mode at $t_1$. In anticipation of a series of gearshifts of the first electric motor, the first electric motor is unloaded to zero torque and the second electric motor is loaded to a power that compensates for the reduction in power of the first electric motor.

At a time $t_2$, the desired power is provided to the second electric motor as a first corresponding gear of the first electric motor is disengaged to enable a neutral state of the first electric motor, realizing a transitional transmission drive range DRN1. In this way, torque reduction may be prevented by increasing the torque of the second electric motor to compensate for the decrease in torque from the first electric motor. If the second electric motor satisfies the torque demand, seamless shifting occurs. However, if the second electric motor does not satisfy the torque demand, torque dip may prevent seamless shifting. At a time $t_3$, the desired power continues to be provided to the second electric motor as electric synchronization compensates for the change in speed of the first electric motor in the transitional transmission drive range DRN1. As such, the first electric motor is operating in the synchronization mode (e.g., indicated by dotted lines) whereas the second electric motor is operating in the traction mode (e.g., indicated by solid lines). The speed of the first electric motor is decelerating to a value until a pre-determined speed threshold between the respective shaft wherein the first electric motor is coupled and the gear is realized.

The desired power continues to be provided to the second electric motor as a second corresponding gear of the first electric motor is engaged to enable the first electric motor to operate at a second speed of the first electric motor, enabling a final transmission drive range DR21 at a time t4. Further, the first electric motor continues to operate in the synchronization mode and the second electric motor continues to operate in the traction mode. At a time $t_5$, the first electric motor is loaded to increase torque produced by the first electric motor and the second electric motor is unloaded to decrease torque produced while in the final transmission drive range DR21 in the traction mode. In this way, the second electric motor no longer compensates for the first electric motor in regards to torque production and torque production by the first electric motor and the second electric motor is based on vehicle torque request, pedal load request, and the like. After supplying the appropriate load, the first electric motor and second electric motor are powered at a time $t_6$ in the final transmission drive range in the traction mode.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

The technical effect of utilizing a control system coupled to a transmission system wherein a first electric motor is coupled to a first shaft comprising a plurality of gear meshes and a first low friction engaging device, a second motor is coupled to a second shaft comprising a plurality of gears meshes and a second low friction engaging device, and the first shaft and second shaft are oriented parallel to an intermediate shaft comprising a plurality of gears is that gearshifts may be performed with increased efficiency of seamless shifting with null torque interruption and reduced manufacturing costs due to utilizing less gears and other mechanical components.

The disclosure also provides support for a transmission system, comprising: an intermediate shaft oriented parallel to both of a first shaft comprising a first gear mesh of a plurality of gear meshes, a third gear mesh of the plurality of gear meshes, and a first low friction engaging device located between the first gear mesh and the third gear mesh and a second shaft comprising a second gear mesh of the plurality of gear meshes, a fourth gear mesh of the plurality of gear meshes, and a second low friction engaging device located between the second gear mesh and the fourth gear mesh, a first electric motor coupled to the first shaft to enable a first reduction ratio of the first electric motor via the first gear mesh and a second reduction ratio of the first electric motor between the first shaft and the intermediate shaft via the third gear mesh, and a second electric motor coupled to the second shaft to enable a first reduction ratio of the second electric motor via the second gear mesh and a second reduction ratio of the second electric motor via the fourth gear mesh between the second shaft and the intermediate shaft. In a first example of the system, the first electric motor and the second electric motor are not co-axial, and the first shaft, the intermediate shaft, and the second shaft are not located in a same plane.

In a second example of the system, optionally including the first example, the first gear mesh comprises a first gear and a second gear, the second gear mesh comprises the second gear and a third gear, the third gear mesh comprises a fourth gear and a fifth gear, and the fourth gear mesh comprises the fifth gear and a sixth gear, and wherein the first gear, the third gear, the fourth gear, and the sixth gear are idler gears locked onto their respective shafts via at least one of the first low friction engaging device or second low friction engaging device. In a third example of the system, optionally including one or both of the first and second examples, the second gear and the fifth gear are permanently locked to the intermediate shaft, and the first low friction engaging device is a first dog clutch and the second low friction engaging device is a second dog clutch. In a fourth example of the system, optionally including one or more or each of the first through third examples, at least one end of the intermediate shaft is external to a gearbox housing to enable coupling to a driveline external to the gearbox housing in a pre-determined configuration wherein the first shaft is coupled to the first gear, fourth gear, and the first low friction engaging device, the intermediate shaft is coupled to the second gear and the fifth gear, and the second shaft is coupled to the third gear, the sixth gear, and the second low friction engaging device.

In a fifth example of the system, optionally including one or more or each of the first through fourth examples, one of the first shaft and second shaft has a different angular velocity at will than the second shaft or first shaft, respectively, when none of its idler gears are engaged. In a sixth example of the system, optionally including one or more or each of the first through fifth examples, the first gear coupled to the first shaft and the third gear coupled to the second shaft are meshed onto the second gear coupled to the intermediate shaft, and the fourth gear coupled to the first shaft and the sixth gear coupled to the second shaft are meshed onto the fifth gear coupled to the intermediate shaft. In a seventh example of the system, optionally including one or more or each of the first through sixth examples, the first reduction ratio of the first electric motor exceeds the first reduction ratio of the second electric motor and the second reduction ratio of the first electric motor exceeds the second reduction ratio of the second electric motor, enabling a speed of the first electric motor to be greater than the speed of the second electric motor.

In an eighth example of the system, optionally including one or more or each of the first through seventh examples, the first reduction ratio of the first electric motor is equal to the first reduction ratio of the second electric motor and the second reduction ratio of the first electric motor is equal to the second reduction ratio of the second electric motor. In a ninth example of the system, optionally including one or more or each of the first through eighth examples, in an optional configuration wherein at least one end of the intermediate shaft is not external to the gearbox housing and one end of a third shaft is external to the gearbox housing to enable coupling with the driveline external to the gearbox housing, the transmission system further comprises the third shaft coupled to a fifth gear mesh comprising a seventh gear coupled to the intermediate shaft and an eighth gear permanently locked to the third shaft to enable a third reduction ratio between the intermediate shaft and the third shaft.

The disclosure also provides support for a transmission system, comprising: a control system comprising a plurality of sensors, one or more actuators, and an electronic control unit (ECU) communicatively coupled to a first electric motor coupled to a first shaft comprising a plurality of gears and a first low friction engaging device located between the plurality of gears, a second electric motor coupled to a second shaft comprising the plurality of gears and a second low friction engaging device located between the plurality of gears, and an intermediate shaft comprising the plurality of gears wherein instructions stored in at least one memory and executed by at least one processor of the ECU to cause an adjustment of the one or more actuators based on data received by the plurality of sensors to perform gearshifts of the transmission system.

In a first example of the system, the plurality of sensors monitors at least a first shaft speed, a second shaft speed, and an intermediate shaft speed, and the plurality of sensors includes speeds sensors and clutch position sensors. In a second example of the system, optionally including the first example, the plurality of gears comprises at least a first gear, a second gear, a third gear, a fourth gear, a fifth gear, and a sixth gear wherein the first gear, the third gear, the fourth gear, and the sixth gear that are engaged or disengaged by at least one of the first low friction engaging device and the second low friction engaging device via the one or more actuators to enable various configurations of the transmission system.

In a third example of the system, optionally including one or both of the first and second examples, the various configurations of the transmission system comprise a first configuration of the first shaft may comprise engaging the first gear and disengaging the fourth gear via the first low friction engaging device via at least one of the one or more actuators to enable a first speed of the first electric motor, a second configuration of the first shaft may comprise disengaging the first gear and engaging the fourth gear via the first low friction engaging device via at least one of the one or more actuators to enable a second speed of the first electric motor, and a third configuration of the first shaft may comprise disengaging the first gear and disengaging the fourth gear via the first low friction engaging device via at least one of the one or more actuators to enable the first electric motor to enter a neutral state.

In a fourth example of the system, optionally including one or more or each of the first through third examples, the various configurations of the transmission system comprise a first configuration of the second shaft may comprise engaging the third gear and disengaging the sixth gear via the second low friction engaging device via at least one of the one or more actuators to enable a first speed of the second electric motor, a second configuration of the second shaft may comprise disengaging the third gear and engaging the sixth gear via the second low friction engaging device via at least one of the one or more actuators to enable a second speed of the second electric motor, and a third configuration of the second shaft may comprise disengaging the third gear and disengaging the sixth gear via the second low friction engaging device via at least one of the one or more actuators to enable the second electric motor to enter a neutral state.

The disclosure also provides support for a method, comprising: powering a first electric motor via a power source while operating in an initial transmission drive range, powering a second electric motor via the power source while operating in the initial transmission drive range, adjusting load of the first electric motor and the second electric motor while operating in the initial transmission drive range, adjusting gear engagement or disengagement of at least one gear via a low friction engaging device via an actuator based on a desired gearshift to achieve a transitional transmission drive range, entering or maintaining at least one of a synchronization mode or traction mode of the first electric motor and the second electric motor based on desired gearshift while operating in the transitional transmission drive range, adjusting gear engagement or disengagement of at least one gear via the low friction engaging device via the actuator based on the desired gearshift to achieve a final transmission drive range, adjusting load of the first electric motor and the second electric motor while operating in the final transmission drive range, and providing power to the first electric motor and the second electric motor while operating in the final transmission drive range.

In a first example of the method, a transmission drive range comprises a state of the first electric motor and a state of the second electric motor wherein the first electric motor and the second electric motor may be in one of a neutral state, operating at a first speed, or operating at a second speed. In a second example of the method, optionally including the first example, the synchronization mode is an operation mode for speed control of the first electric motor and the second electric motor wherein speed of a respective electric motor decelerates or accelerates to a value wherein a speed difference between a respective shaft coupled to the respective electric motor and a desired gear is within a pre-determined speed threshold.

In a third example of the method, optionally including one or both of the first and second examples, the traction mode is an operation mode for torque control of the first electric motor and the second electric motor wherein load of either the first electric motor and second electric motor is maintained or adjusted to enable desired torque production by the first electric motor and the second electric motor or adjusted to compensate for decreases in torque of one of the first electric motor or the second electric motor. In a fourth example of the method, optionally including one or more or each of the first through third examples, the first electric motor is disconnected via entering the neutral state to avoid overspeeding of the first electric motor when a vehicle is operating in the transmission drive range wherein both the first electric motor and second electric motor are operating at the second speed and a nominal speed of the vehicle is exceeded.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system of a vehicle, comprising:
an intermediate shaft oriented parallel to both of and offset to each of a first shaft comprising only a first gear mesh and a third gear mesh of a plurality of gear meshes, and a first dog clutch located between the first gear mesh and the third gear mesh and a second shaft comprising only a second gear mesh and a fourth gear mesh of the plurality of gear meshes, and a second dog clutch located between the second gear mesh and the fourth gear mesh;
a first electric motor coupled to the first shaft to enable one of a first reduction ratio of the first electric motor via the first gear mesh and a second reduction ratio of the first electric motor between the first shaft and the intermediate shaft via the third gear mesh; and
a second electric motor coupled to the second shaft to enable one of a first reduction ratio of the second electric motor via the second gear mesh and a second reduction ratio of the second electric motor via the fourth gear mesh between the second shaft and the intermediate shaft; and
a control system with instructions stored in memory and configured to: operate with the first dog clutch engaged to the third gear mesh, the second dog clutch engaged with the fourth gear mesh, a speed of the first electric motor exceeding a speed of the second electric motor, and disconnect the first electric motor via entering a neutral state by disengaging the first dog clutch in response to the first electric motor reaching an overspeed limit prior to the second electric motor and a vehicle speed exceeding a nominal speed.

2. The system of claim 1, wherein the first electric motor and the second electric motor are not co-axial, and the first shaft, the intermediate shaft, and the second shaft are not located in a same plane.

3. The system of claim 1, wherein the first gear mesh comprises a first gear coupled to the first shaft and a second gear coupled to the intermediate shaft, the second gear mesh comprises the second gear and a third gear coupled to the second shaft, the third gear mesh comprises a fourth gear coupled to the first shaft and a fifth gear coupled to the intermediate shaft, and the fourth gear mesh comprises the fifth gear and a sixth gear coupled to the second shaft, and wherein the first gear, the third gear, the fourth gear, and the sixth gear are idler gears locked onto their respective shafts via at least one of the first dog clutch or the second dog clutch.

4. The system of claim 3, wherein the second gear and the fifth gear are permanently locked to the intermediate shaft.

5. The system of claim 1, wherein at least one end of the intermediate shaft is external to a gearbox housing to enable coupling to a driveline external to the gearbox housing in a pre-determined configuration wherein the first shaft is coupled the first dog clutch and the second shaft is coupled the second dog clutch and wherein one of the first shaft and the second shaft has a different angular velocity than the other one of the second shaft or first shaft, respectively, when none of its idler gears are engaged.

6. The system of claim 5, wherein the first gear coupled to the first shaft and the third gear coupled to the second shaft are meshed onto the second gear coupled to the intermediate shaft, and the fourth gear coupled to the first shaft and the sixth gear coupled to the second shaft are meshed onto the fifth gear coupled to the intermediate shaft.

7. The system of claim 1, wherein the first reduction ratio of the first electric motor exceeds the first reduction ratio of the second electric motor and the second reduction ratio of the first electric motor exceeds the second reduction ratio of the second electric motor, enabling a speed of the first electric motor to be greater than the speed of the second electric motor.

8. The system of claim 1, wherein the first reduction ratio of the first electric motor is equal to the first reduction ratio of the second electric motor and the second reduction ratio of the first electric motor is equal to the second reduction ratio of the second electric motor.

9. The system of claim 5, wherein in an optional configuration wherein at least one end of the intermediate shaft is not external to the gearbox housing and one end of a third shaft is external to the gearbox housing to enable coupling with the driveline external to the gearbox housing, the transmission system further comprises the third shaft coupled to a fifth gear mesh comprising a seventh gear coupled to the intermediate shaft and an eighth gear permanently locked to the third shaft to enable a third reduction ratio between the intermediate shaft and the third shaft.

10. A method, comprising:
powering a first electric motor via a power source while operating in an initial transmission drive range, a transmission drive range comprising a state of the first electric motor and a state of the second electric motor wherein the first electric motor and the second electric motor is in one of a neutral state, operating at a first speed, or operating at a second speed;
powering a second electric motor via the power source while operating in the initial transmission drive range;
adjusting load of the first electric motor and the second electric motor while operating in the initial transmission drive range;
adjusting gear engagement or disengagement of at least one gear via a dog clutch via an actuator based on a desired gearshift to achieve a transitional transmission drive range;
entering or maintaining at least one of a synchronization mode or traction mode of the first electric motor and the second electric motor based on desired gearshift while operating in the transitional transmission drive range;
adjusting gear engagement or disengagement of at least one gear via the dog clutch via the actuator based on the desired gearshift to achieve a final transmission drive range;
adjusting load of the first electric motor and the second electric motor while operating in the final transmission drive range; and
providing power to the first electric motor and the second electric motor while operating in the final transmission drive range, wherein the first electric motor is disconnected via entering the neutral state to avoid overspeeding of the first electric motor when a vehicle is operating in the transmission drive range wherein both the first electric motor and second electric motor are operating at the second speed and a nominal speed of the vehicle is exceeded.

11. The method of claim 10, wherein the synchronization mode is an operation mode for speed control of the first electric motor and the second electric motor wherein speed of a respective electric motor decelerates or accelerates to a value wherein a speed difference between a respective shaft coupled to the respective electric motor and a desired gear is within a pre-determined speed threshold.

12. The method of claim 10, wherein the traction mode is an operation mode for torque control of the first electric motor and the second electric motor wherein load of either the first electric motor and second electric motor is maintained or adjusted to enable desired torque production by the first electric motor and the second electric motor or adjusted to compensate for decreases in torque of one of the first electric motor or the second electric motor.

13. The system of claim 1, wherein the first dog clutch is the only dog clutch coupled to the first shaft and the second dog clutch is the only dog clutch coupled to the second shaft.

14. The system of claim 9, wherein the third shaft is parallel to each of the first shaft, the second shaft, and the intermediate shaft.

* * * * *